US012760911B2

(12) United States Patent
Choi et al.

(10) Patent No.: US 12,760,911 B2
(45) Date of Patent: Oct. 13, 2026

(54) HUMIDIFIER

(71) Applicant: LG ELECTRONICS INC., Seoul (KR)

(72) Inventors: Chiyoung Choi, Seoul (KR); Jaeheuk Choi, Seoul (KR); Dongryul Park, Seoul (KR); Yongmin Kim, Seoul (KR); Jeonghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 18/539,870

(22) Filed: Dec. 14, 2023

(65) Prior Publication Data

US 2024/0200792 A1 Jun. 20, 2024

(30) Foreign Application Priority Data

Dec. 19, 2022 (KR) ........................ 10-2022-0177805

(51) Int. Cl.
*F24F 1/0011* (2019.01)
*B01D 45/08* (2006.01)
(Continued)

(52) U.S. Cl.
CPC ............ *F24F 1/0011* (2013.01); *B01D 45/08* (2013.01); *F24F 1/0087* (2019.02); *F24F 6/12* (2013.01);
(Continued)

(58) Field of Classification Search
CPC ....... F24F 6/00; F24F 6/12; F24F 6/14; B01D 45/00; B01D 45/08; B01D 46/00; B01D 47/00; B01D 49/00
See application file for complete search history.

(56) References Cited

U.S. PATENT DOCUMENTS 5,396,884 A * 3/1995 Bagwell .............. A61M 16/147 D25/48.8
5,593,469 A * 1/1997 Crawford .............. B01F 23/214 96/240
(Continued)

FOREIGN PATENT DOCUMENTS

CN 104964418 A * 10/2015 .............. F24F 11/89
KR 10-2012-0095293 8/2012
(Continued)

OTHER PUBLICATIONS

European Search Report issued in Application No. 23217839.2 dated May 23, 2024.

*Primary Examiner* — Sharon Pregler
(74) *Attorney, Agent, or Firm* — KED & ASSOCIATES

(57) ABSTRACT

The present disclosure relates to a humidifier. A humidifier according to one aspect of the present disclosure includes: a case with an intake opening; a fan disposed inside the case; a discharge opening positioned downstream of the fan; a humidification assembly including a humidification device disposed between the fan and the discharge opening, for spraying supplied water, and an outlet through which mist produced by the humidification device is discharged; and an impactor disposed between the outlet and the discharge opening, to which the mist discharged through the outlet is admitted. Thus, the droplet size of humidified air discharged through the discharge opening can be reduced.

17 Claims, 12 Drawing Sheets

(51) Int. Cl.

| | |
|---|---|
| ***F24F 1/0087*** | (2019.01) |
| ***F24F 6/12*** | (2006.01) |
| *F24F 6/00* | (2006.01) |
| *F24F 6/02* | (2006.01) |

(52) U.S. Cl.

CPC ......... *F24F 2006/008* (2013.01); *F24F 6/025* (2013.01)

(56) References Cited

U.S. PATENT DOCUMENTS

| | | | |
|---|---|---|---|
| 6,244,576 | B1 | 6/2001 | Tsai |
| 2022/0364745 | A1 | 11/2022 | Song |

FOREIGN PATENT DOCUMENTS

| | | |
|---|---|---|
| KR | 10-1276044 | 6/2013 |
| KR | 10-2013-0092093 | 8/2013 |
| KR | 10-2016-0025626 | 3/2016 |
| KR | 10-2179545 | 11/2020 |
| KR | 10-2022-0105488 | 8/2022 |

* cited by examiner

HUMIDIFIER

CROSS-REFERENCE TO RELATED PATENT APPLICATIONS

This application claims priority to Korean Patent Application No. 10-2022-0177805, filed Dec. 19, 2022, whose entire disclosures are hereby incorporated by reference.

BACKGROUND

Field

The present disclosure relates to a humidifier, and more particularly, to a humidifier that discharges mist.

Related Art

A humidifier is an appliance that supplies moisture-containing air within a room. The humidifier is equipped with a water reservoir for storing water, and is classified as ultrasonic humidifier, heated humidifier, natural evaporative humidifier, or hybrid humidifier depending on the method of humidification.

Ultrasonic humidifiers are equipped with a vibrator to create vibrations from ultrasonic waves, and convert water into mist using the vibrations from the vibrator and spray it.

Ultrasonic humidifiers have advantages such as converting the water stored in the water reservoir into mist and spraying large amounts of mist.

However, conventional humidifiers have the problem of poor cleanliness due to droplet formation near a discharge opening because the size of droplets contained in the mist is too large. In the case of cylindrical humidifiers, droplets form at a narrow discharge opening which extends in a circumferential direction, making it difficult to remove the droplets and increasing the area of contamination from the droplets.

Another problem with conventional humidifiers is that the humidifiers are not easy to maintain hygienically because disassembling the humidifiers into parts to clean them is hard work.

PRIOR ART DOCUMENTS

Patent Documents (Patent Document 0001) KR10-2012-0095293
(Patent Document 0002) KR10-2022-0105488

SUMMARY

The present disclosure is directed to overcoming the above problems and others.

Another aspect of the present disclosure is to reduce the droplet size of mist.

Yet another aspect of the present disclosure is to allow uniform discharge of mist in a circumferential direction of a humidifier.

A further aspect of the present disclosure is to minimize flow resistance.

A further aspect of the present disclosure is to prevent dew formation in the humidifier.

A further aspect of the present disclosure is to make it easy to maintain the humidifier in a hygienic condition.

A further aspect of the present disclosure is to facilitate the disassembly and assembly of parts.

The aspects of the present disclosure are not limited to the foregoing, and other aspects not mentioned herein will be able to be clearly understood by those skilled in the art from the following description.

To accomplish the foregoing aspects, a humidifier according to an aspect of the present disclosure includes: a case with an intake opening.

The humidifier includes a fan disposed inside the case.

The humidifier includes a discharge opening positioned downstream of the fan.

The humidifier includes a humidification assembly including a humidification device disposed between the fan and the discharge opening, for spraying supplied water, and an outlet through which mist produced by the humidification device is discharged.

The humidifier includes an impactor disposed between the outlet and the discharge opening, to which the mist discharged through the outlet is admitted. Thus, the size of droplets supplied through the discharge opening can be reduced.

The mist discharged from the humidification assembly may be then discharged through the discharge opening after hitting the impactor.

The impactor may include a lower body including a lower plate disposed above the outlet and a lower hole formed through the lower plate.

The impactor may include an upper body including an upper plate disposed above the lower body and an upper hole vertically formed through the upper plate.

The lower hole and the upper hole may be alternately arranged in a circumferential direction of the impactor.

The diameter of the lower hole may be larger than the diameter of the upper hole.

The lower hole may vertically face the upper plate, and the upper hole may vertically face the lower plate.

The lower hole may be vertically spaced apart from the upper plate.

The impactor may include a lower space formed between the lower hole and the upper plate.

The impactor may include an outer wall that surrounds the upper plate.

The impactor may include an upper space surrounded by the outer wall and formed above the upper hole.

The impactor may include a first lower body including a first lower plate disposed above the outlet and a first lower hole formed through the first lower plate.

The impactor may include a first upper body attached to the top of the first lower body and including a first upper hole which is vertically formed.

The impactor may include a second lower body attached to the top of the first upper body and including a second lower hole which is vertically formed.

The impactor may include a second upper body attached to the top of the second lower body and including a second upper hole which is vertically formed.

Mist that has passed through the first upper hole is admitted into the second lower body through the second lower hole.

The diameter of the first lower hole may be larger than the diameter of the second lower hole The humidifier may include a water reservoir disposed inside the case, for storing water supplied to the humidification assembly.

The humidifier may include a humidification flow path formed between the outlet and the discharge opening and surrounding the water reservoir.

The impactor may be disposed in the humidification flow path in such a way as to surround the water reservoir.

The water reservoir may include a bucket forming a space for storing water.

The water reservoir may include a bucket housing for holding the bucket.

The impactor may be positioned below the bucket.

The water reservoir may include a guide rim protruding toward the humidification flow path and positioned above the outlet.

The impactor may be seated on the top of the guide rim.

The impactor may include a lower plate disposed above the outlet.

The impactor may include a lower hole vertically formed through the lower plate and extending in a circumferential direction of the lower plate.

The impactor may include a lower body disposed above the outlet and including a lower hole which is vertically formed.

The impactor may include an upper plate disposed above the lower body.

The impactor may include an outer wall spaced radially outward from the upper plate.

The impactor may include an upper rim spaced radially inward from the upper plate.

The impactor may include an outer bridge connecting the upper plate and the outer wall.

The impactor may include an inner bridge connecting the upper plate and the upper rim.

The impactor may include an outer hole formed between the upper plate and the outer wall.

The impactor may include an inner hole formed between the upper plate and the upper rim.

The outer hole and the inner hole may be spaced apart from each other radially of the impactor, and the lower hole, positioned between the outer hole and the inner hole, faces the upper plate.

The impactor may include an inner hole vertically formed through the upper plate and positioned further radially inward of the impactor than the lower hole.

The impactor may include an outer hole vertically formed through the upper plate and positioned further radially outward of the impactor than the lower hole.

The inner hole may be formed to bulge radially inward of the impactor, and the outer hole may be formed to bulge radially outward of the impactor.

A humidifier according to an aspect of the present disclosure includes: a case with an intake opening; a fan disposed inside the case; a discharge opening positioned downstream of the fan; a water reservoir disposed inside the case in such a way as to be pulled out, and internally having a space for storing water; a humidification assembly that sprays water supplied from the water reservoir; a humidification flow path that connects the humidification assembly and the discharge opening and is formed to surround the water reservoir; and an impactor into which mist produced in the humidification assembly is admitted, and that is disposed in the humidification flow path in such a way as to surround the water reservoir. Thus, the impactor can be easily removed and cleaned.

The impactor may be configured to be pulled out of the case.

The humidifier may include an inner case spaced radially outward from the water reservoir.

The humidification flow path may extend vertically between the water reservoir and the inner case, and the impactor may be disposed between the water reservoir and the inner case.

The humidification assembly may include: a humidification device that generates mist.

The humidification assembly may include an outlet through which the mist generated by the humidification device is discharged.

The water reservoir may include a water reservoir bottom wall spaced upward from the outlet and facing the outlet.

The impactor may be configured to surround the water reservoir bottom wall.

The humidification assembly may include a guide wall that extends radially outward from the outlet and slopes upward toward the impactor.

The impactor may be seated on the top of the guide rim, and may be pulled out of the case, along with the water reservoir.

Specific details of other embodiments are included in the detailed description and the drawings.

According to at least one of the embodiments of the present disclosure, the size of droplets of mist can be reduced by providing an impactor.

According to at least one of the embodiments of the present disclosure, the size of droplets of mist can be minimized by providing an impactor with a stack of a plurality of parts.

According to at least one of the embodiments of the present disclosure, mist can be discharged uniformly in a circumferential direction of the humidifier by providing a ring-shaped impactor.

According to at least one of the embodiments of the present disclosure, flow resistance can be minimized by means of the stack structure of the impactor.

According to at least one of the embodiments of the present disclosure, dew formation at the discharge opening of the humidifier can be prevented owing to the reduction in the size of droplets.

According to at least one of the embodiments of the present disclosure, the disassembly and assembly of the impactor is made easy because the impactor is disposed in a humidification flow path.

The effects of the present disclosure are not limited to the foregoing, and other effects not mentioned herein will be able to be clearly understood by those skilled in the art from the following description.

DESCRIPTION OF EXEMPLARY EMBODIMENTS

Figure 1:
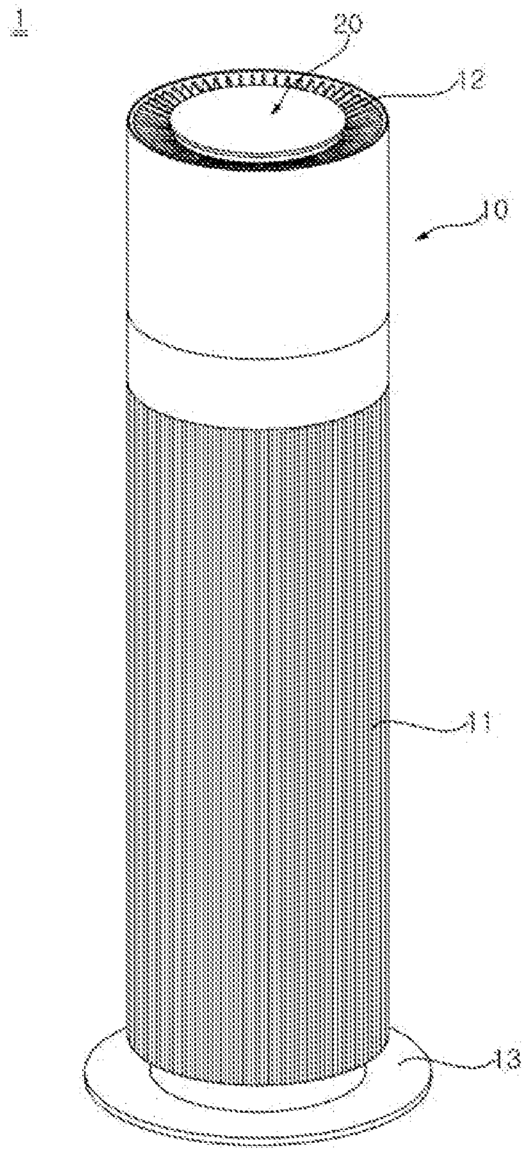
FIG. 1 is a perspective view of a humidifier according to an embodiment of the present disclosure.

Hereinafter, the embodiments disclosed in the present specification will be described in detail with reference to the accompanying drawings. The same or similar elements will be assigned the same reference numerals irrespective of the reference numerals, and redundant descriptions thereof will be omitted.

The suffixes "module" and "unit" for elements used in the following embodiments are given or interchangeably used in consideration of only the ease of drafting the specification and do not have a meaning or role distinct from each other.

In describing the embodiments disclosed in the present specification, a detailed description of a related known technology will be omitted when it is deemed that it may unnecessarily obscure the subject matter of the present disclosure. Also, it should be understood that the appended drawings are intended only to help understand the embodiments disclosed in the present specification and do not limit the technical idea disclosed in the present disclosure; rather, it should be understood that all changes, equivalents, and substitutions included in the technical scope and spirit of the present disclosure are included.

Terms such as 'first', 'second', etc., may be used to describe various components, but the components are not to be construed as being limited to the terms.

The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

The singular expressions may include plural expressions unless the context clearly dictates otherwise.

Referring to FIG. 1, a humidifier 1 will be described. FIG. 1 is a perspective view of the humidifier 1.

The humidifier 1 may include a case 10. The case 10 may internally have a space. The case 10 may be cylindrical.

The humidifier 1 may include an intake opening 11. The intake opening 11 may be formed around the circumference of the case 10. Air from outside the humidifier 1 may enter the case 10 through the intake opening 11.

The humidifier 1 may include a discharge opening 12. The discharge opening 12 may be formed on the top of the case 10. Air drawn into the case 10 may be discharged out of the case 10 through the discharge opening 12.

The humidifier 1 may include a base 13. The base 13 may be disposed at the bottom of the case 10. The base 13 may have a larger diameter than the case 10.

The humidifier 1 may include a water reservoir 20. The water reservoir 20 may be disposed inside the case 10. A space for storage of water may be formed inside the water reservoir 20. The discharge opening 12 may be formed radially outward from the water reservoir 20. The discharge opening 12 may be formed to surround the water reservoir 20.

Figure 2:
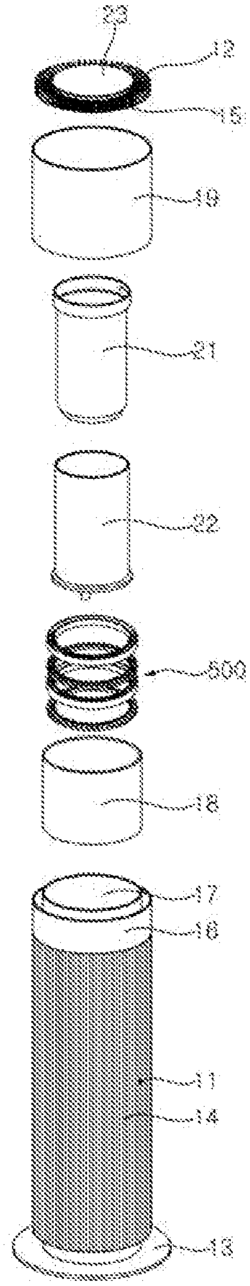
FIG. 2 is an exploded view of a humidifier according to an embodiment of the present disclosure.

Referring to FIG. 2, the humidifier 1 will be described. FIG. 2 is an exploded view of the humidifier 1.

The humidifier 1 may include an intake grille 14. The intake grille 14 may be disposed around the circumference of the case 10. The intake grille 14 may form the intake opening 11. The intake grille 14 may be cylindrical.

The humidifier 1 may include a discharge grille 15. The discharge grille 15 may be disposed at an upper part of the case 10. The discharge grille 15 may form the discharge opening 12. The discharge grille 15 may be ring-shaped.

The humidifier 1 may include a first outer case 16. The first outer case 16 may be cylindrical. The intake grille 14 may be attached to and detached from the first outer case 16. The first outer case 16 may form the exterior of the case 10.

The humidifier 1 may include a first inner case 17. The first inner case 17 may be cylindrical. The first inner case 17 may be disposed radially inward from the first outer case 16. The first outer case 16 and the first inner case 17 may be radially spaced apart from each other The humidifier 1 may include a second outer case 19. The second outer case 19 may be cylindrical. The second outer case 19 may be disposed above the first outer case 16. The second outer case 19 may form the exterior of the case 10.

The humidifier 1 may include a second inner case 18. The second inner case 18 may be cylindrical. The second inner case 18 may be disposed above the first inner case 17. The second inner case 18 may be disposed radially inward from the second outer case 19. The second outer case 19 and the second inner case 18 may be radially spaced apart from each other.

The first outer case 16 and the second outer case 19 may be removably coupled together. Then again, the first outer case 16 and the second outer case 19 may be formed as a single body. The first outer case 16 and the second outer case 19 may be called "outer case".

The first inner case 17 and the second inner case 18 may be removably coupled together. Then again, the first inner case 17 and the second inner case 18 may be formed into a single body. The first inner case 17 and the second inner case 18 may be called "inner case".

The humidifier 1 may include a bucket 21. The bucket 21 may be cylindrical with an open top. The bucket 21 may internally have a space for storing water.

The humidifier 1 may include a bucket housing 22. The bucket housing 22 may surround the bucket 21. The bucket housing 22 may be cylindrical with an open top. The bucket 21 may be disposed inside the bucket housing 22.

The humidifier 1 may include a bucket cover 23. The bucket cover 23 may be disposed above the bucket 21. The bucket cover 23 may be removably attached to the discharge grille 15.

The water reservoir 20 may include the bucket 21, the bucket housing 22, and the bucket cover 23. The water reservoir 20 may be disposed inside the inner case 18. The water reservoir 20 and the inner case 18 may be radially spaced apart from each other.

The humidifier 1 may include an impactor 500. The impactor 500 may be ring-shaped. The impactor 500 may be configured to surround the water reservoir 20. The impactor 500 may be disposed inside the inner case 18.

Figure 3:
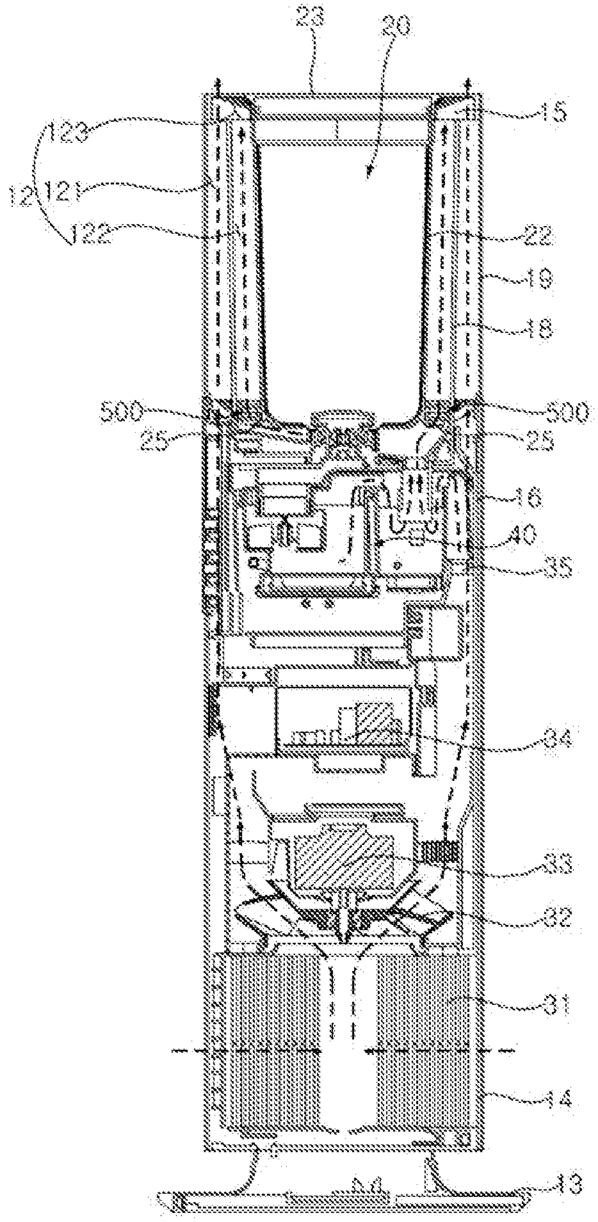
FIG. 3 is a cross-sectional view of a humidifier according to an embodiment of the present disclosure.

Referring to FIG. 3, the humidifier 1 will be described.

FIG. 3 is a vertical cross-sectional view of the humidifier 1.

The humidifier 1 may include a filter 31. The filter 31 may be disposed inside the intake grille 14. The filter 31 may be cylindrical.

The humidifier 1 may include a fan 32. The fan 32 may be disposed above the filter 31. The fan 32 may be disposed inside the intake grille 14.

The humidifier 1 may include a fan motor 33. The fan motor 33 may rotate the fan 32. The fan motor 33 may be disposed above the fan 32.

The humidifier 1 may include a controller 34. The controller 34 may be disposed inside the case 10. The controller 34 may be disposed between the fan motor 33 and a humidification assembly 40. The controller 34 may control the operation of the fan motor 33 and the humidification assembly 40. The controller 34 may include a plurality of PCB substrates.

The humidifier 1 may include an auxiliary fan 35. The auxiliary fan 35 may be disposed inside the case 10. The auxiliary fan 35 may be disposed at an entrance of the humidification assembly 40.

The humidifier 1 may include the humidification assembly 40. The humidification assembly 40 may be disposed inside the case 10. The humidification assembly 40 may be disposed between the water reservoir 20 and the fan 32. The humidification assembly 40 may cause water supplied from the water reservoir 20 to break up into tiny particles and deliver them to the discharge opening 12. Part of air blown by the fan 32 may enter the humidification assembly 40.

The discharge grille 15 may be disposed between the water reservoir 20 and the outer case 19. The inner case 18 may be disposed between the reservoir 20 and the outer case 19. The discharge grille 15 may be disposed above the inner case 18.

The discharge opening 12 may include a first discharge opening 121. The first discharge opening 121 may be formed between the outer case 19 and the inner case 18. The air blown by the fan 32 may flow upward through the first discharge opening 121. The first discharge opening 121 may extend in a ring shape. The first discharge opening 121 may be called "air flow path".

The discharge opening 12 may include a second discharge opening 122. The second discharge opening 122 may be formed between the inner case 18 and the water reservoir 20. Humidified air that has passed through the humidification assembly 40 may flow upward through the second discharge opening 122. The second discharge opening 122 may extend in a ring shape. The second discharge opening 122 may be called "humidification flow path".

The discharge opening 12 may include a mixing discharge opening 123. The mixing discharge opening 123 may be formed above the first discharge opening 121 and the second discharge opening 122. The mixing discharge opening 123 may be formed at the discharge grille 15. The mixing discharge opening 123 may extend in a ring shape. The mixing discharge opening 123 may be formed between the outer case 19 and the bucket cover 23. Air flowing in the first discharge opening 121 and air flowing in the second discharge opening 122 may be mixed together in the mixing discharge opening 123.

Conceptually, the discharge opening 12 may include the first discharge opening 121, the second discharge opening 122, and the mixing discharge opening 123. Then again, it may refer to a space open toward the outside of the case 10, separated from the above-mentioned components 121, 122, and 123. The discharge opening 12 may open toward the top of the case 10. The discharge opening 12 may be formed at the discharge grille 15. The discharge opening 12 may be formed to surround the water reservoir 20. The air blown by the fan 32 may flow through the discharge opening 12.

The air flow path 121 may be connected to the discharge opening 12. The humidification flow path 122 may be connected to the discharge opening 12. The air in the air flow path 121 and the air in the humidification flow path 122 may be mixed together in the discharge opening 12.

Air admitted into the case 10 through the intake grille 14 may pass through a filter 31 and be blown upward by the fan 32. Part of the air blown upward by the fan 32 may enter the humidification assembly 40, and the rest may flow upward through the first discharge opening 121. The air admitted to the humidification assembly 40, containing fine water drops, may flow upward through the second discharge opening 122. The air flowing through the first discharge opening 121 and the humidified air flowing through the second discharge opening 122 may be mixed together in the mixing discharge opening 123 and discharged upward of the humidifier 1.

The humidifier 1 may include an impactor 500. The impactor 500 may be disposed between the water reservoir 20 and the inner case 18. The impactor 500 may be disposed above the humidification assembly 40. The impactor 500 may be disposed in the humidification flow path 122. The impactor 500 may be disposed at a position corresponding to the bottom of the water reservoir 20.

The water reservoir 20 may include a guide rim 25. The guide rim 25 may extend in a circumferential direction of the water reservoir 20. The impactor 500 may be seated on the top of the guide rim 25.

Figure 4:
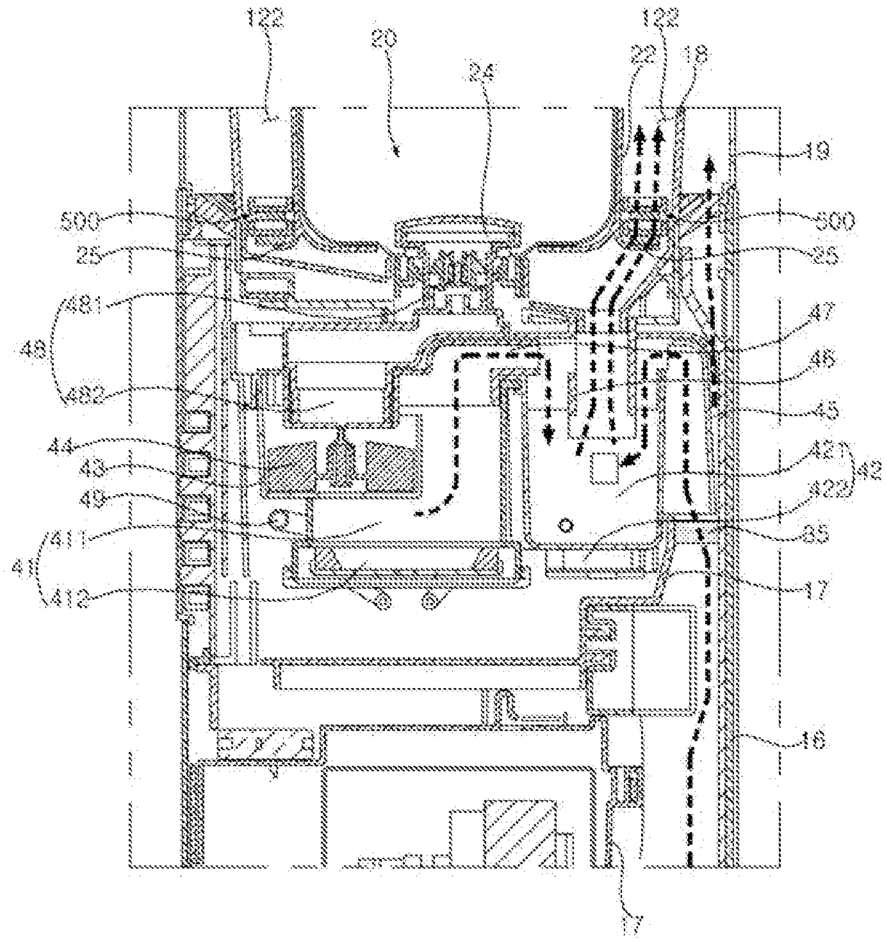
FIG. 4 is a partial cross-sectional view of a humidifier according to an embodiment of the present disclosure.

Referring to FIG. 4, the humidifier 1 will be described.

FIG. 4 is a partial vertical cross-sectional view of the humidifier 1.

The humidifier 1 may include the humidification assembly 40. The humidification assembly 40 may be disposed below the water reservoir 20. Humidified air produced in the humidification assembly 40 may be discharged upward.

The humidification assembly 40 may include a heating device 41. The heating device 41 may heat water and air admitted into it.

The heating device 41 may include a heating chamber 411. The heating chamber 411 may internally have a space. The water stored in the water reservoir 20 may be admitted to the heating chamber 411.

The heating device 41 may include a heater 412. The heater 412 may be attached to the bottom of the heating chamber 411. The heater 412 may apply heat into the heating chamber 411. The heater 412 may heat the water and air admitted into the heating chamber 411.

The humidification assembly 40 may include a humidification device 42. The humidification device 42 may convert the admitted water into fine water drops and discharge them upward.

The humidification assembly 42 may include a humidification chamber 421. The humidification chamber 421 may internally have a space. The water heated in the heating device 41 may be admitted to the humidification chamber 421.

The humidification device 42 may include a vibrating device 422. The vibrating device 422 may be attached to the bottom of the humidification chamber 421. The vibrating device 422 may generate vibrations by using ultrasonic waves. By the operation of the vibrating device 422, the water in the humidification chamber 421 may be converted into fine water drops. The humidification device 42 may work on the same principle as well-known ultrasonic humidifiers.

The humidification assembly 40 may include a valve housing 43. The valve housing 43 may be attached to the heating device 41. The valve housing 43 may be disposed within the heating chamber 411.

The humidification assembly 40 may include a valve 44. The valve 44 may be a floating valve. The valve 44 may be movably disposed inside the valve housing 43. The valve 44 may be moved upward and downward within the valve housing 43 and selectively supply water into the heating chamber 411.

The humidification assembly 40 may include an inlet 45. The inlet 45 may be connected to the humidification device 42. The inlet 45 may be connected to the inside of the humidification chamber 421. Part of the air blown by the fan 32 (see FIG. 3) may enter the humidification chamber 421 through the inlet 45. The auxiliary fan 35 may be attached to the inlet 45. The auxiliary fan 35 may draw air flowing between the outer case 16 and the inner case 17 into the inlet 45.

The humidification assembly 40 may include an outlet 46. The outlet 46 may be connected to the humidification device 42. The outlet 46 may protrude toward the inside of the humidification chamber 421. Fine water drops produced by the humidification device 42 may flow upward through the outlet 46.

The humidification assembly 40 may include a connector 47. The connector 47 may connect the heating device 41 and the humidification device 42. The connector 47 may connect the heating chamber 411 and the humidification chamber 421. The connector 47 may face the outlet 46.

The humidification assembly 40 may include a supply port 48. The supply port 48 may connect the water reservoir 20 and the heating device 41. The water in the water reservoir 20 may be admitted into the heating device 41 through the supply port 48.

The supply port 48 may include a first supply port 481. The first supply port 481 may be connected to the water reservoir 20. The first supply port 481 may be connected to the bottom of the bucket housing 22.

The water reservoir 20 may include a discharge port 24. The discharge port 24 may be disposed at the bottom of the water reservoir 20. The discharge port 24 may be connected to the first supply port 481.

The supply port 48 may include a second supply port 482. The second supply port 482 may connect the first supply port 481 and the valve housing 43. Water admitted into the first supply port 481 may be admitted into the valve housing 43 through the second supply port 482.

The humidification assembly 40 may include a connecting pipe 49. The connecting pipe 49 may connect the heating device 41 and the humidification device 42. The connecting pipe 49 may connect the heating chamber 411 and the humidification chamber 421. The water in the heating chamber 411 may be admitted into the humidification chamber 421 through the connecting pipe 49.

Part of the air flowing between the outer case 16 and the inner case 17 may be admitted to the humidification device 42 through the inlet 45. The air admitted to the humidification device 42, containing fine water drops produced within the humidification device 42, may flow upward through the outlet 46. The air flowing upward through the outlet 46 may flow upward between the water reservoir 20 and the inner case 18.

The water in the water reservoir 20 may be admitted into the valve housing 43 through the supply port 48. The water in the valve housing 43 may be admitted into the heating device 41 by movement of the valve 44. The water admitted into the heating device 41 may be heated by the heater 412. The water heated within the heating chamber 411 may be admitted into the humidification chamber 421 through the connecting pipe 49. The water admitted into the humidification chamber 421 may be converted into fine water drops by the vibrating device 422. The fine water drops, along with the air admitted through the inlet 45, may flow upward through the outlet 46.

The humidified air flowing through the outlet 46 may pass through the impactor 500. The humidified air discharged through the outlet 46 may pass through the impactor 500 and enter the humidification flow path 122. The impactor 500 may be disposed above the outlet 46.

The humidified air, after exiting the outlet 46, may be dispersed in a circumferential direction of the water reservoir 20 by the guide rim 25. The humidified air dispersed in the circumferential direction of the water reservoir 20 may pass through the impactor 500 and enter the humidification flow path 122.

Figure 5:
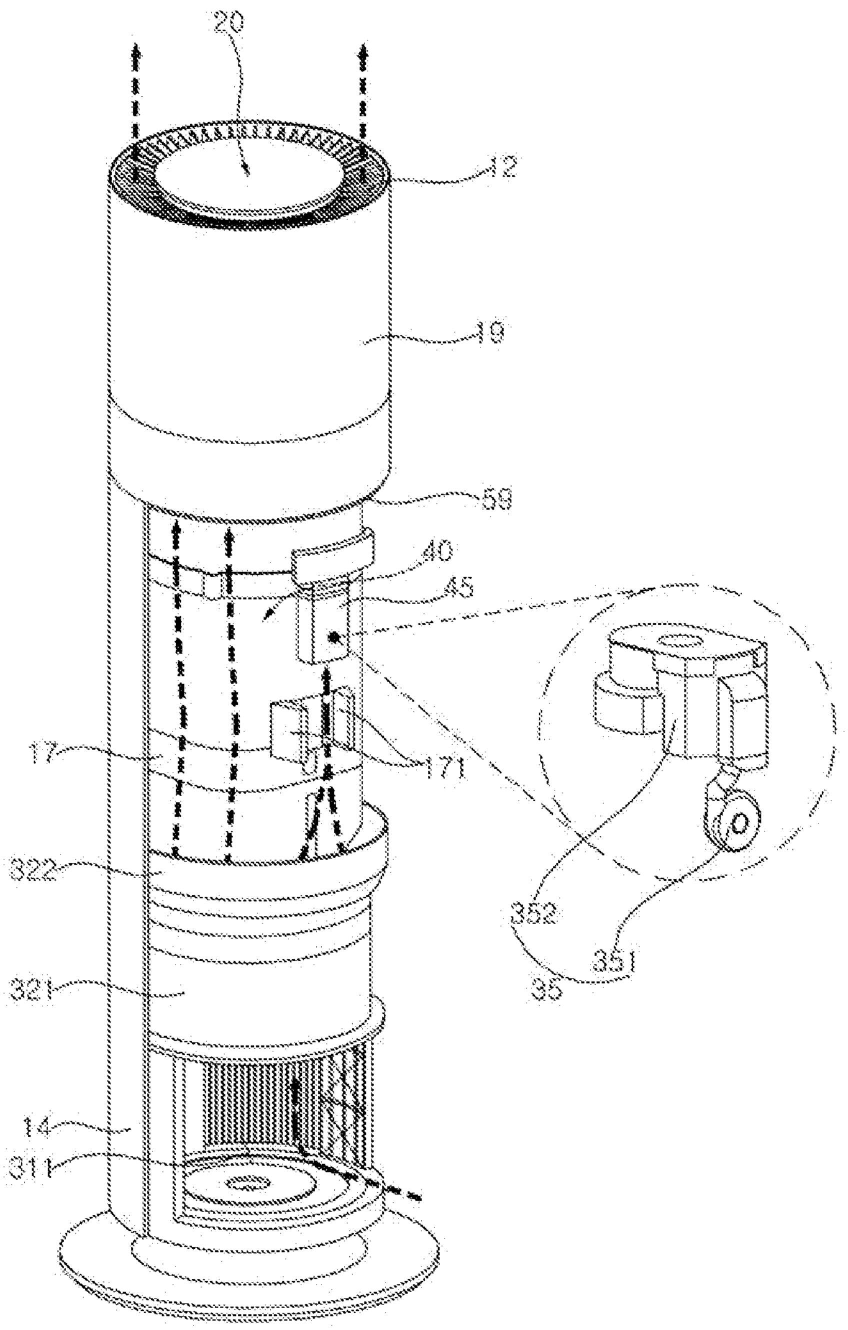
FIG. 5 is an exploded view of some parts of a humidifier according to an embodiment of the present disclosure.

Referring to FIG. 5, the humidifier 1 will be described.

FIG. 5 illustrates a humidifier 1 from which the first outer case 16 is removed.

The humidifier 1 may include a filter mounting space 311. The filter mounting space 311 may be formed inside the intake grille 14. The filter 31 (see FIG. 3) may be disposed in the filter mounting space 311. The air admitted through the intake grille 14 may pass through the filter mounting space 311 and flow upward.

The humidifier 1 may include a fan housing 321. The fan 32 (see FIG. 3) may be disposed inside the fan housing 321. The fan housing 321 may be disposed above the filter 31 (see FIG. 3).

The humidifier 1 may include a housing top 322. The housing top 322 may form the top of the fan housing 321. The housing top 322 may be spaced radially outward from the inner case 17. The air blown by the fan 32 (see FIG. 3) may flow upward through a space formed between the inner case 17 and the housing top 322.

The humidifier 1 may include a guide 171. The guide 171 may protrude radially outward from the inner case 17. The guide 171 may be disposed between the inlet 45 and the fan housing 321. A plurality of guides 171 may be spaced apart from each other in a circumferential direction of the inner case 17. A space between the plurality of guides 171 may vertically face the inlet 45. A space between the plurality of guides 171 may vertically face the housing top 322.

The humidifier 1 may include an inner grille 59. The inner grille 59 may be disposed above the humidification assembly 40. The inner grille 59 may be disposed radially outward from the inner case 17. The inner grille 59 may be attached to the outer case 19.

Part of the air blown by the fan 43 (see FIG. 3) may enter the inlet 45. Part of the air blown by the fan 32 may enter the inlet 45 through the space between the plurality of guides 171. The air admitted to the humidification assembly 40 through the inlet 45, containing fine water drops, may be discharged through the discharge opening 12.

The auxiliary fan 35 may be disposed at the inlet 45. The auxiliary fan 35 may draw the air blown by the fan 32 (see FIG. 3) into the humidification assembly 40.

The auxiliary fan 35 may include a fan device 351. The fan device 351 may be a turbofan. The fan device 351 may be a sirocco fan.

The auxiliary fan 35 may include a supporter 352. The supporter 352 may be attached to the fan device 351. The supporter 352 may be fixed to the inlet 45. The supporter 352 may connect the fan device 351 and the inlet 45.

Part of the air blown by the fan 32 may flow upward through a space between the outer case 16 (see FIG. 3) and the inner case 17 and pass through the inner grille 59. The air that has passed through the inner grille 59 may flow upward and be discharged through the discharge opening 12.

Figure 6:
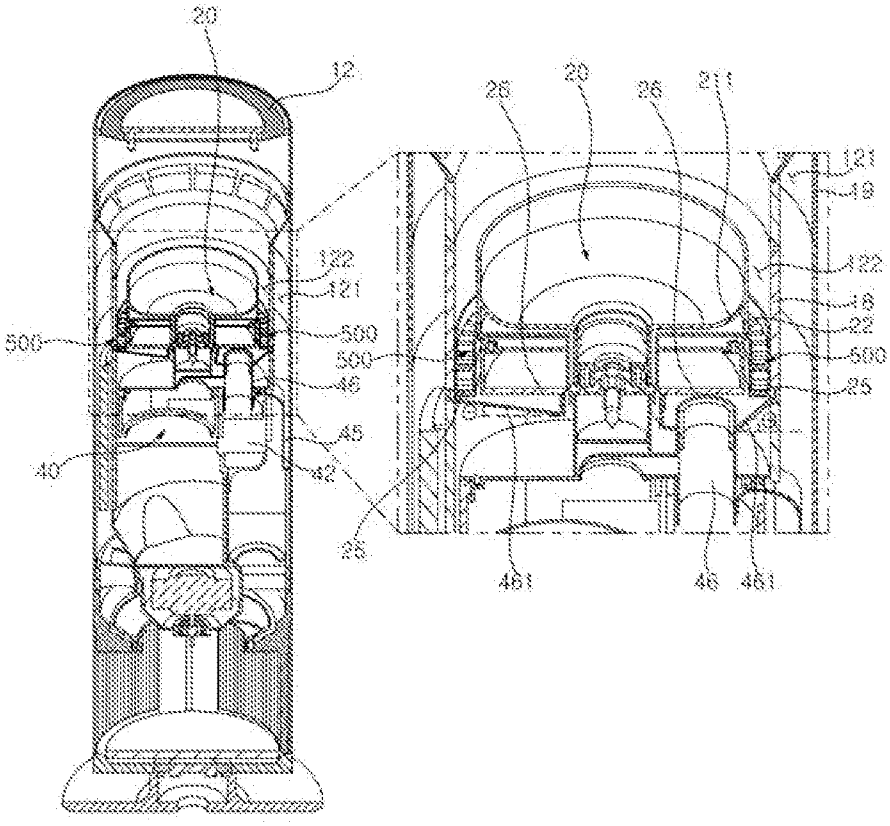
FIG. 6 is a partial cutaway view of a humidifier according to an embodiment of the present disclosure.

Referring to FIG. 6, the humidifier 1 will be described.

FIG. 6 is a vertical cutaway view of the humidifier 1 when viewed obliquely.

The impactor 500 may be disposed above the humidification assembly 40. Part of the air admitted to the humidifier 1 may enter the humidification device 42 through the inlet 45. Mist generated by the humidifier 42 may flow toward the impactor 500 through the outlet 46.

The impactor 500 may be disposed in the humidification flow path 122. The impactor 500 may be disposed upstream of the discharge opening 12. The impactor 500 may be disposed between the humidification device 42 and the discharge opening 12.

The air flow path 121 may be formed between the outer case 19 and the inner case 18. The humidification flow path 122 may be formed between the bucket housing 22 and the inner case 18.

The impactor 500 may be disposed between the water reservoir 20 and the inner case 18. The impactor 500 may be seated on the top of the guide rim 25 which extends along the circumference of the bucket housing 22.

The impactor 500 may have a ring shape. The impactor 500 may be configured to surround the water reservoir 20. The impactor 500 may extend along the direction in which the humidification flow path 122 extends.

The impactor 500 may be spaced upward from the outlet 46. The humidification assembly 40 may include a guide wall 461 that extends radially outward from the outlet 46. The guide wall 461 may have the shape of a partially open disc. Mist discharged from the outlet 46 may flow upward from the guide wall 461. The guide wall 461 may slope upward and radially outward. The guide wall 461 may have an angle θ of inclination with respect to the horizontal.

The impactor 500 may be spaced upward from the guide wall 461. The impactor 500 may be spaced upward from an outer end of the guide wall 461. The impactor 500 may vertically face the outer end of the guide wall 461. The guide rim 500 may vertically face the outer end of the guide wall 461. Mist flowing along the guide wall 461 may flow upward and pass through the impactor 500.

The water reservoir 20 may include a water reservoir bottom wall 26. The water reservoir bottom wall 26 may be spaced upward from the guide wall 461. The water reservoir bottom wall 26 may be disposed radially inward from the impactor 500. The water reservoir bottom wall 26 may be spaced upward from the outlet 46. Mist discharged from the outlet 46 may hit the water reservoir bottom wall 26.

The bucket 21 may include a bucket bottom wall 211. The bucket bottom wall 211 may form a bottom wall of a space where water is stored. The bucket bottom wall 211 may be spaced upward from the water reservoir bottom wall 26. The bucket bottom wall 211 may be positioned above the impactor 500. The impactor 500 may be positioned at a height midway between the bucket bottom wall 211 and the guide wall 461.

The water reservoir 20 may be pulled out of the case 10. The water reservoir 20 may be disposed inside the case 10 in such a way as to be pulled out.

When the water reservoir 20 is pulled out of the case 10, the impactor 500 may be placed in such a position as to be pulled out of the case 10. The impactor 500 may be exposed out of the case 10. When the water reservoir 20 is pulled out of the case 10, the impactor 500, along with the guide rim 25, may be pulled out of the case 10.

The user may pull the water reservoir 20 out of the case 10 to clean the humidification flow path 122 and the impactor 500.

Figure 7:
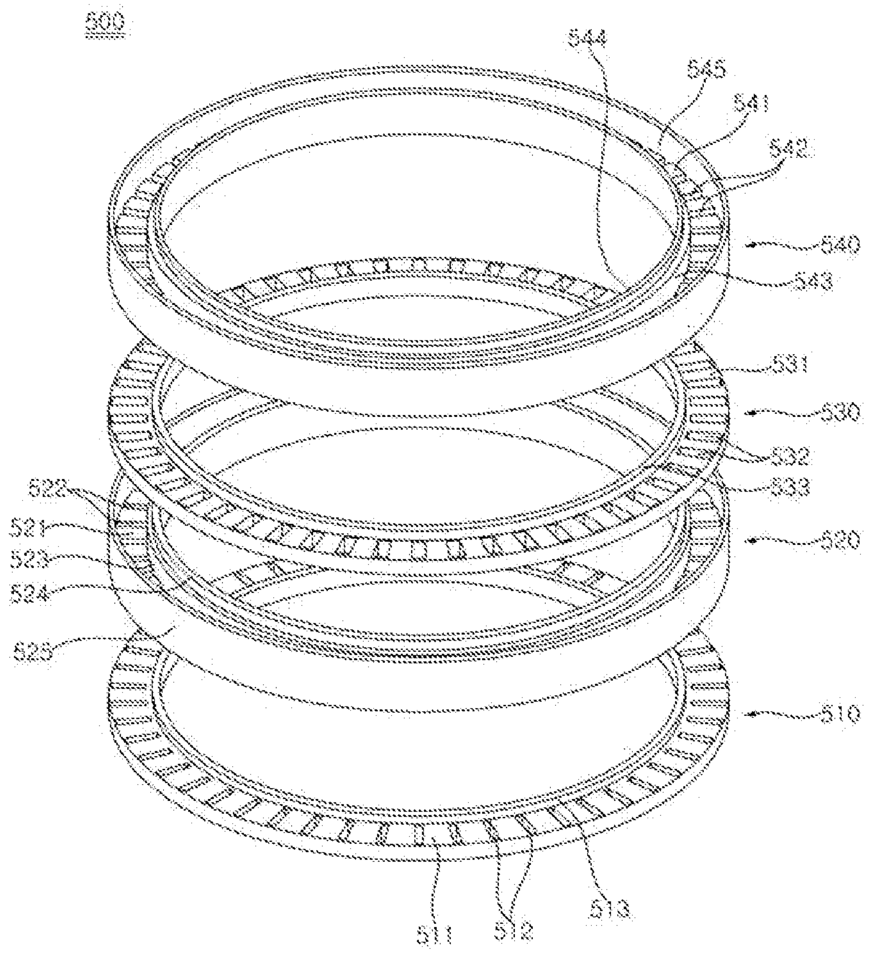
FIG. 7 is an exploded view of an impactor according to an embodiment of the present disclosure.
Figure 8:
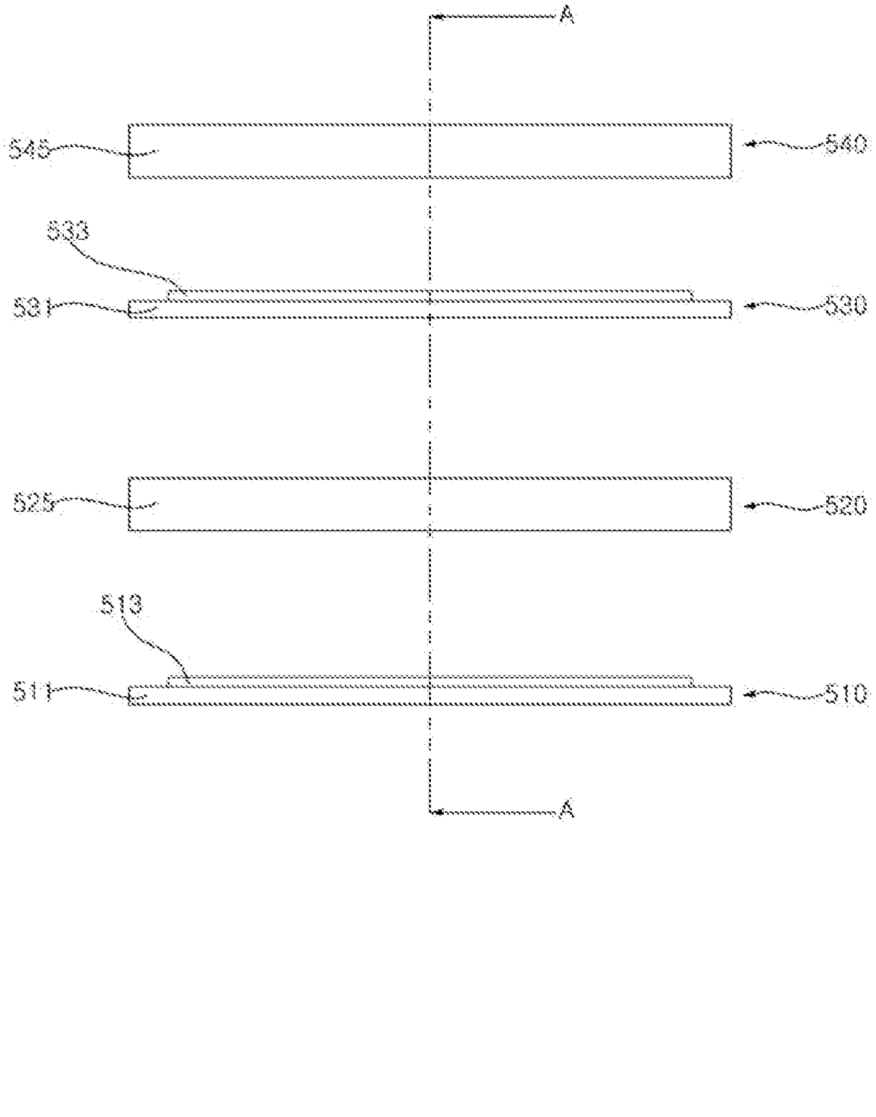
FIG. 8 is an exploded view of an impactor according to an embodiment of the present disclosure.
Figure 9:
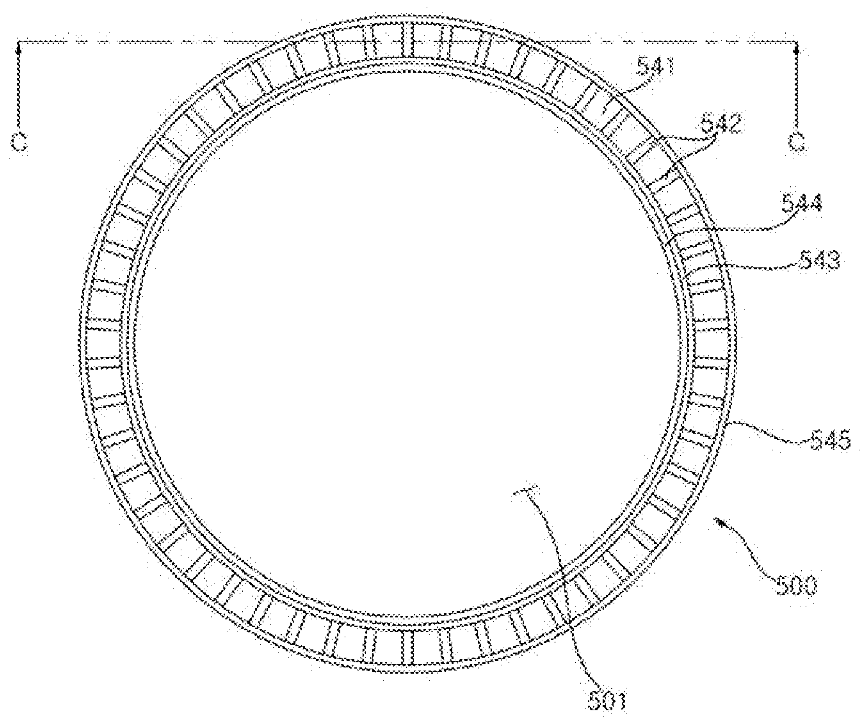
FIG. 9 is a top view of an impactor according to an embodiment of the present disclosure.

Referring to FIG. 7, FIG. 8, and FIG. 9, the impactor 500 will be described.

FIG. 7 is an exploded view of the impactor 500. FIG. 8 is an exploded view of the impactor 500 when viewed from the front. FIG. 9 illustrates the impactor 500 when viewed from above.

The impactor 500 may include a first lower body 510. The first lower body 510 may be ring-shaped. The first lower body 510 may be called "lower body". The first lower body 510 may be seated on the guide rim 25 (see FIG. 6).

The impactor 500 may include a first upper body 520. The first upper body 520 may be attached to the top of the first upper body 520. The first upper body 520 may be called "upper body". The first upper body 520 may be ring-shaped.

The impactor 500 may include a second lower body 530. The second lower body 530 may be ring-shaped. The second lower body 530 may be attached to the top of the first upper body 520.

The impactor 500 may include a second upper body 540. The second upper body 540 may be ring-shaped. The second upper body 540 may be attached to the top of the second lower body 530.

The impactor 500 of the present disclosure may only have the first lower body 510 and the first upper body 520.

The first lower body 510 may include a first lower plate 511. The first lower plate 511 may be ring-shaped.

The first lower body 510 may include a first lower hole 512. The first lower hole 512 may be vertically formed through the first lower plate 511. A plurality of first lower holes 512 may be formed along the direction in which the first lower plate 511 extends, spaced out from one another.

The first lower body 510 may include a first lower rim 513. The first lower rim 513 may protrude upward from the first lower plate 511. The first lower rim 513 may extend along the direction in which the first lower plate 511 extends.

The first upper body 520 may include a first upper plate 521. The first upper plate 521 may be ring-shaped. The first upper plate 521 may be disposed above the first lower plate 511.

The first upper body 520 may include a first upper hole 522. The first upper hole 522 may be vertically formed through the first upper plate 521. A plurality of first upper holes 522 may be formed along the direction in which the first upper plate 521 extends, spaced out from one another.

The first upper body 520 may include a first upper rim 523. The first upper rim 523 may protrude upward from the first upper plate 521. The first upper rim 523 may extend along the direction in which the first upper plate 521 extends.

The first upper body 520 may include a first inner rim 524. The first inner rim 524 may protrude upward from the first upper plate 521. The first inner rim 524 may extend along the direction in which the first upper plate 521 extends. The first inner rim 524 may be spaced radially inward from the first upper rim 523.

The first upper body 520 may include a first outer wall 525. The first outer wall 525 may be attached radially outward from the first upper plate 521. The first outer wall 525 may be cylindrical. The first outer wall 525 may be configured to surround the first upper plate 521.

The second lower body 530 may include a second lower plate 531. The second lower plate 531 may be ring-shaped.

The second lower body 530 may include a second lower hole 532. The second lower hole 532 may be vertically formed through the second lower plate 531. A plurality of second lower holes 532 may be formed along the direction in which the second lower plate 531 extends, spaced out from one another.

The second lower body 530 may include a second lower rim 533. The second lower rim 533 may protrude upward form the second lower plate 531. The second lower rim 533 may extend along the direction in which the second lower plate 531 extends.

The second upper body 540 may include a second upper plate 541. The second upper plate 541 may be ring-shaped. The second upper plate 541 may be disposed above the second lower plate 531.

The second upper body 540 may include a second upper hole 542. The second upper hole 542 may be vertically formed through the second upper plate 541. A plurality of second upper holes 542 may be formed along the direction in which the second upper plate 541 extends, spaced out from one another.

The second upper body 540 may include a second upper rim 543. The second upper rim 543 may protrude upward from the second upper plate 541. The second upper rim 543 may extend along the direction in which the second upper plate 541 extends.

The second upper body 540 may include a second inner rim 544. The second inner rim 544 may protrude upward from the second upper plate 541. The second inner rim 544 may extend along the direction in which the second upper plate 541 extends. The second inner rim 544 may be spaced radially inward from the second upper rim 543.

The second upper body 540 may include a second outer wall 545. The second outer wall 545 may be attached radially outward from the second upper plate 541. The second outer wall 545 may be cylindrical. The second outer wall 545 may be configured to surround the second upper plate 541.

The first lower body 510 and the first upper body 520 may be vertically coupled together. The first upper body 520 may be seated on the top of the first lower plate 511.

The first upper body 520 and the second lower body 530 may be vertically coupled together. The second lower body 530 may be seated on the top of the first outer wall 525.

The second lower body 530 and the second upper body 540 may be vertically coupled together. The second upper body 540 may be seated on the top of the second lower plate 531.

Mist that has passed through the impactor 500 may exit the impactor 500 through the second upper hole 542. The second upper hole 542 may be formed between the second outer wall 545 and the second upper rim 543. Mist that has passed through the second upper hole 542 may pass through a space formed between the second outer wall 545 and the second upper rim 543 and flow upward.

The impactor 500 may include a penetrating space 501. The penetrating space 501 may be a cylindrical space. The penetrating space 501 may provide a space through which the water reservoir 20 penetrates. The penetrating space 501 may be surrounded by the first lower rim 513, the first inner rim 524, the second lower rim 533, and the second inner rim 544. The water reservoir 20 may be inserted into the space surrounded by the above-described structure 513, 524, 533, and 544, and supported by the above-described structure 513, 524, 533, and 544.

Figure 10:
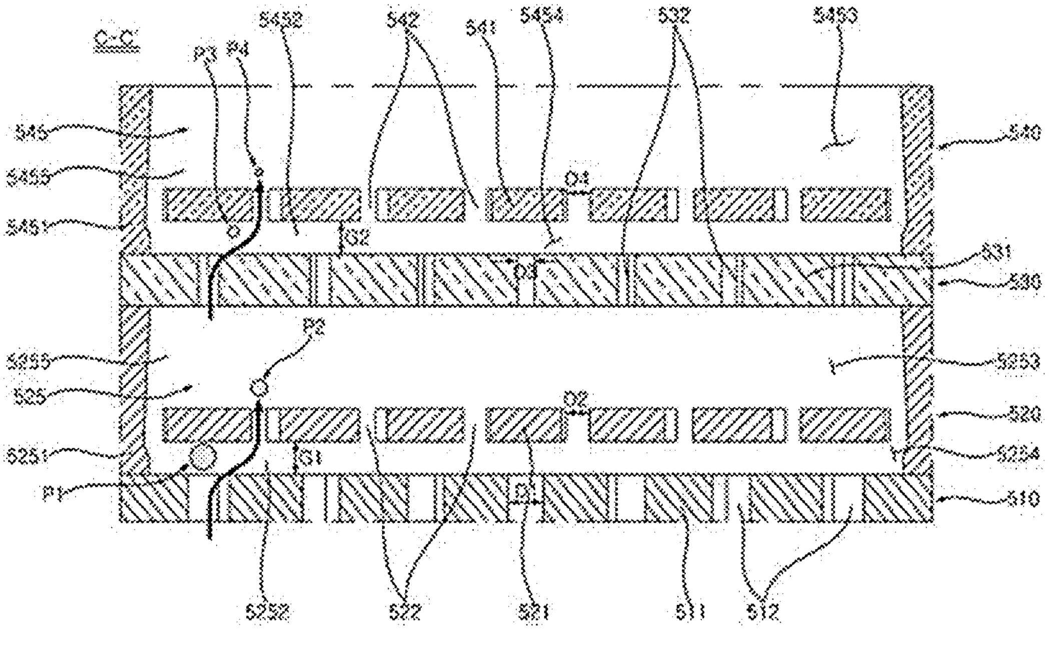
FIG. 10 is a cross-sectional view of an impactor according to an embodiment of the present disclosure.
Figure 11:
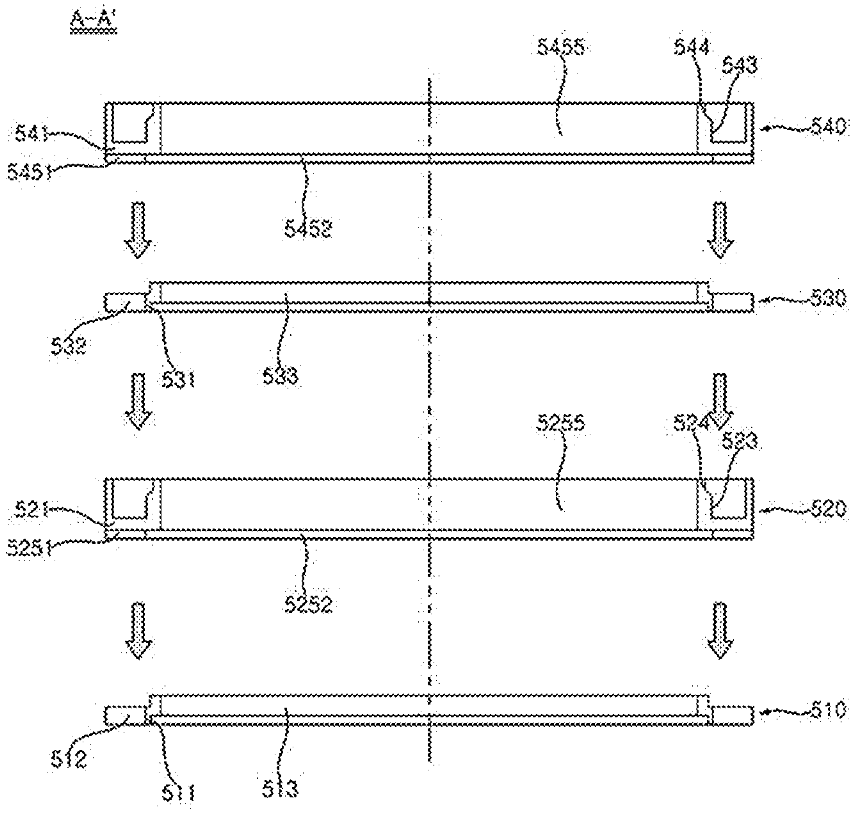
FIG. 11 is a cross-sectional view of an impactor according to an embodiment of the present disclosure.
Figure 12:
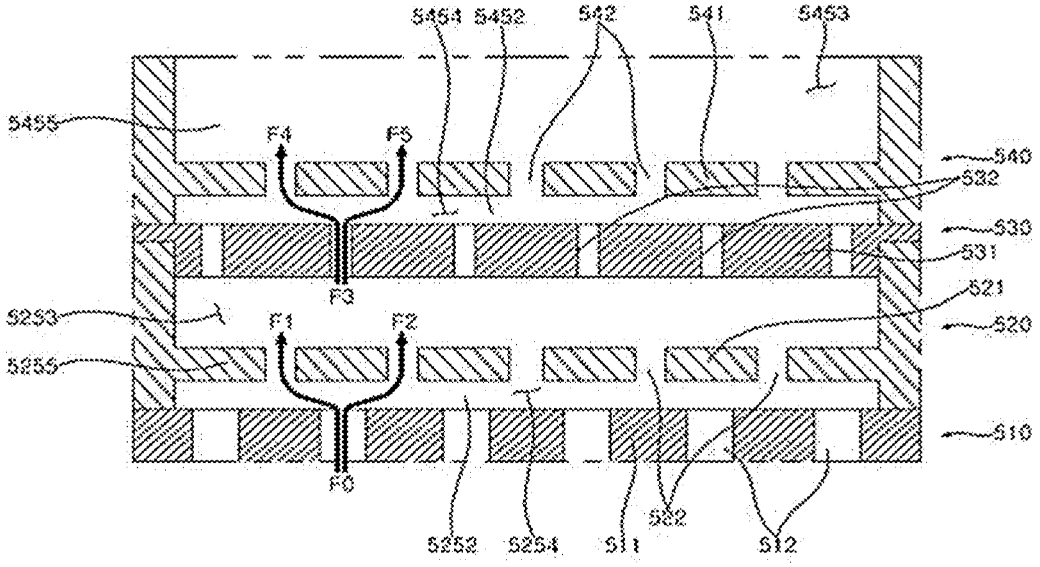
FIG. 12 is a cross-sectional view of an impactor according to an embodiment of the present disclosure.

Referring to FIGS. 10 to 12, the impactor 500 will be described.

FIG. 10 is a cross-sectional view of the impactor 500 taken along the line C-C' shown in FIG. 9. FIG. 11 is an exploded cross-sectional view of the impactor 500. FIG. 12 is a partial cross-sectional view of the impactor 500 taken along the line C-C'.

The first lower plate 511 and the first upper plate 521 may be vertically spaced apart from each other. A gap G1 may be formed between the first lower plate 511 and the first upper plate 521.

The plurality of first lower holes 512 may be spaced out from one another in a circumferential direction of the impactor 500. The plurality of first upper holes 522 may be spaced out from one another in the circumferential direction of the impactor 500.

The plurality of first lower holes 512 and the plurality of first upper holes 522 may be alternately arranged in the circumferential direction of the impactor 500.

The first lower holes 512 may be positioned below spaces between the plurality of first upper holes 522. The first upper holes 522 may be positioned above spaces between the plurality of first lower holes 512.

The first lower holes 512 may be disposed below the first upper plate 521. The first lower holes 512 may vertically face the first upper plate 521.

The first upper holes 522 may be disposed above the first lower plate 511. The first upper holes 522 may vertically face the first lower plate 511.

The first outer wall 525 may include a first lower edge 5251. The first lower edge 5251 may be attached to the first lower plate 511. The first lower edge 5251 may protrude downward from the first upper plate 521. Since the first lower edge 5251 protrudes downward from the first upper plate 521 and is attached to the first lower plate 511, the gap G1 may be formed between the first lower plate 511 and the first upper plate 521.

The first outer wall 525 may include a first lower wall 5252. The first lower wall 5252 may refer to the bottom of the first outer wall 525 positioned between the first lower plate 511 and the first upper plate 521. The first lower wall 5252 may be cylindrical.

The first outer wall 525 may include a first upper wall 5255. The first upper wall 5255 may refer to the top of the first outer wall 525 positioned between the first upper plate 521 and the second lower body 530. The first upper wall 5255 may be cylindrical.

The first outer wall 525 may include a first upper space 5253. The first upper space 5253 may be a space surrounded by the first upper wall 5255. The first upper space 5253 may be formed between the first upper plate 521 and the second lower body 530.

The first outer wall 525 may include a first lower space 5254. The first lower space 5254 may be a space surrounded by the first lower wall 5252. The first lower space 5254 may be formed between the first lower plate 511 and the first upper plate 521.

The second lower plate 531 and the second upper plate 541 may be vertically spaced apart from each other. A gap G2 may be formed between the second lower plate 531 and the second upper plate 541.

The plurality of second lower holes 532 may be spaced out from one another in a circumferential direction of the impactor 500. The plurality of second upper holes 542 may be spaced out from one another in the circumferential direction of the impactor 500.

The plurality of second lower holes 532 and the plurality of second upper holes 542 may be alternately arranged in the circumferential direction of the impactor 500.

The second lower holes 532 may be positioned below spaces between the plurality of second upper holes 542. The second upper holes 542 may be positioned above spaces between the plurality of second lower holes 532.

The second lower holes 532 may be disposed below the second upper plate 541. The second lower holes 532 may vertically face the second upper plate 541.

The second upper holes 542 may be disposed above the second lower plate 531. The second upper holes 5422 may vertically face the second lower plate 531.

The second outer wall 545 may include a second lower edge 5451. The second lower edge 5451 may be attached to the second lower plate 531. The second lower edge 5451 may protrude downward from the second upper plate 541. Since the second lower edge 5451 protrudes downward from the second upper plate 541 and is attached to the second lower plate 531, the gap G2 may be formed between the second lower plate 531 and the second upper plate 541.

The second outer wall 545 may include a second lower wall 5452. The second lower wall 5452 may refer to the bottom of the second outer wall 545 positioned between the second lower plate 531 and the second upper plate 541. The second lower wall 5452 may be cylindrical.

The second outer wall 545 may include a second upper wall 5455. The second upper wall 5455 may refer to the top of the second outer wall 545 positioned above the second upper plate 541. The second upper wall 5455 may be cylindrical.

The second outer wall 545 may include a second upper space 5453. The second upper space 5453 may be a space surrounded by the second upper wall 5455. The second upper space 5453 may be formed above the second upper plate 541.

The second outer wall 545 may include a second lower space 5454. The second lower space 5454 may be a space surrounded by the second lower wall 5452. The second lower space 5454 may be formed between the second lower plate 531 and the second upper plate 541.

The distance D1 between the plurality of first lower holes 512 may be larger than the distance D2 between the plurality of first upper holes 522.

The distance D3 between the plurality of second lower holes 532 may be larger than the distance D4 between the plurality of second upper holes 542.

The distance D1 between the plurality of first lower holes 512 may be larger than the distance D3 between the plurality of second lower holes 532.

The distance D2 between the plurality of first upper holes 522 may be larger than the distance D4 between the plurality of second upper holes 542.

A droplet P1 admitted to the first lower space 5254 through a first lower hole 512 may hit the first upper plate 521. Upon hitting the first upper plate 521, the droplet P1, which has become smaller in diameter as indicated by P2, may be admitted to the first upper space 5253 through a first upper hole 522 as it becomes smaller in diameter P2. After being admitted to the first upper space 5253, the droplet P2 may be admitted to the second lower space 5454 through a second lower hole 532. A droplet P3 admitted to the second lower space 5454 through the second lower hole 532 may hit the second upper plate 541. Upon hitting the second upper plate 541, the droplet P3, which has become smaller in diameter as indicated by P4, may be admitted to the second upper space 5453 through a second upper hole 542. The droplet P4 admitted to the second upper space 5453 may be sprayed to the discharge opening 12 through the humidification flow path 122.

The droplet P1 admitted to the impactor 500 may be broken up into droplets P2, P3, and P4 smaller in diameter as it hits the components 511, 521, 531, and 541 of the impactor 500. As such, the mist that has passed through the impactor 500 may be admitted to the humidification flow path 122, now with a smaller droplet size.

A droplet F0 admitted to the first lower space 5254 through a first lower hole 512 may be distributed to a plurality of first upper holes 522 contiguous to the first lower hole 512 through which it has passed. The droplet F0 admitted to the first lower space 5254 may be broken up into a plurality of droplets F1 and F2 smaller in diameter as it hits the first upper plate 521. The droplets F1 and F2 into which the droplet F0 is broken up by the first upper plate 521 may be admitted to the first upper space 5253 through the plurality of first upper holes 522.

A droplet F3 admitted to the second lower space 5454 through a second lower hole 532 may be distributed to a plurality of second upper holes 542 contiguous to the second lower hole 532 through which it has passed. The droplet F3 admitted to the second lower space 5454 may be broken up into a plurality of droplets F4 and F5 smaller in diameter as it hits the second upper plate 541. The droplets F4 and F5 into which the droplet F3 is broken up by the second upper plate 541 may be admitted to the second upper space 5453 through the plurality of second upper holes 542.

Figure 13:
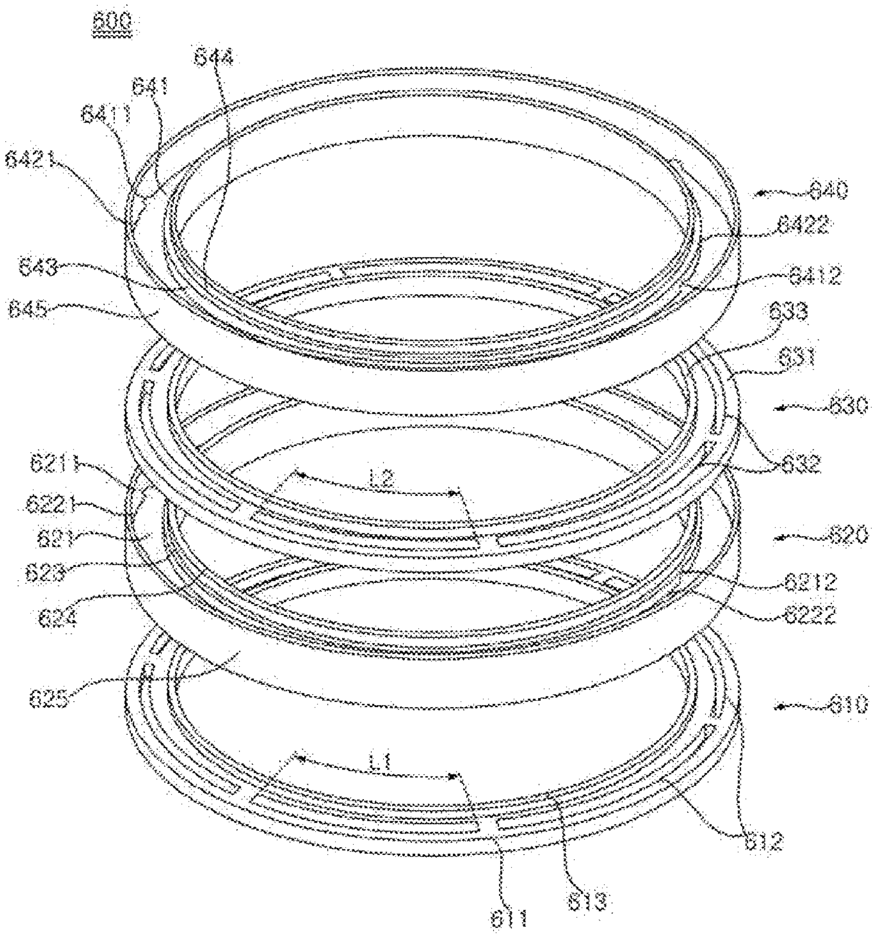
FIG. 13 is an exploded view of an impactor according to another embodiment of the present disclosure.
Figure 14:
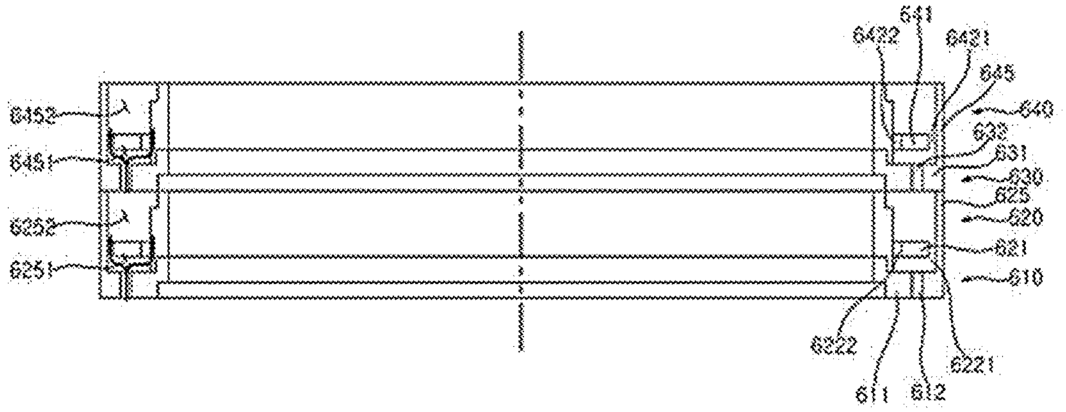
FIG. 14 is a cross-sectional view of an impactor according to another embodiment of the present disclosure.

Referring to FIGS. 13 and 14, an impactor 600 according to another embodiment of the present disclosure will be described.

FIG. 13 is an exploded view of the impactor 600 according to another embodiment of the present disclosure. FIG. 14 is a vertical cross-sectional view of the impactor 600 according to another embodiment of the present disclosure.

The impactor 600 may include a first lower body 610. The description of the first lower body 510A given with reference to FIGS. 1 to 12 may apply equally to the first lower body 610, except the first lower holes 612.

The first lower body 610 may include a first lower hole 612. The first lower hole 612 may be arc-shaped. The first lower hole 612 may be vertically formed through the first lower plate 611. The first lower hole 612 may extend along the circumference of the first lower plate 611. A plurality of first lower holes 612 may be formed in a circumferential direction of the first lower plate 611, spaced out from one another. The first lower holes 612 may have a length L1 in the circumferential direction of the first lower plate 611.

The impactor 600 may include a first upper body 620. The description of the first upper body 520 given with reference to FIGS. 1 to 12 may apply equally to the first upper body 620, except the first upper plate 621, the first outer hole 6221, and the first inner hole 6222.

The first upper body 620 may include a first upper plate 621. The first upper plate 621 may be ring-shaped. The first upper plate 621 may be disposed between a first outer wall 625 and a first upper rim 623. The first upper plate 621 may be spaced radially inward from the first outer wall 625. The first upper plate 621 may be spaced radially outward from the first upper rim 623.

The first upper plate 621 may include a first outer bridge 6211. The first outer bridge 6211 may connect the first upper plate 621 and the first outer wall 625.

The first upper plate 621 may include a first inner bridge 6212. The first inner bridge 6212 may connect the first upper plate 621 and the first upper rim 623.

The first upper body 620 may include a first outer hole 6221. The first outer hole 6221 may be formed between the first upper plate 621 and the first outer wall 625. The first outer hole 6221 may extend in a circumferential direction of the first upper body 620.

The first upper body 620 may include a first inner hole 6222. The first inner hole 6222 may be formed between the first upper plate 621 and the first upper rim 623. The first inner hole 6222 may extend in a circumferential direction of the first upper body 620.

The impactor 600 may include a second lower body 630. The description of the second lower body 530 given with reference to FIGS. 1 to 12 may apply equally to the second lower body 630, except the second lower holes 632.

The second lower body 630 may include a second lower hole 632. The second lower hole 632 may be arc-shaped. The second lower hole 632 may be vertically formed through the second lower plate 631. The second lower hole 632 may extend along the circumference of the second lower plate 631. A plurality of second lower holes 632 may be formed in a circumferential direction of the second lower plate 631, spaced out from one another. The second lower holes 632 may have a length L2 in the circumferential direction of the second lower plate 631.

The impactor 600 may include a second upper body 640. The description of the second upper body 540 given with reference to FIGS. 1 to 12 may apply equally to the second upper body 640, except the second upper plate 641, the second outer hole 6421, and the second inner hole 6422.

The second upper body 620 may include a second upper plate 641. The second upper plate 641 may be ring-shaped. The second upper plate 641 may be disposed between a second outer wall 645 and a second upper rim 643. The second upper plate 641 may be spaced radially inward from the second outer wall 645. The second upper plate 641 may be spaced radially outward from the second upper rim 643.

The second upper plate 641 may include a second outer bridge 6411. The second outer bridge 6411 may connect the second upper plate 641 and the second outer wall 645.

The second upper plate 641 may include a second inner bridge 6412. The second inner bridge 6412 may connect the second upper plate 641 and the second upper rim 643.

The second upper body 640 may include a second outer hole 6421. The second outer hole 6421 may be formed between the second upper plate 641 and the second outer wall 645. The second outer hole 6421 may extend in a circumferential direction of the second upper body 640.

The second upper body 640 may include a second inner hole 6422. The second inner hole 6422 may be formed between the second upper plate 641 and the second upper rim 643. The second inner hole 6422 may extend in a circumferential direction of the second upper body 640.

The first lower body 610 and the first upper body 620 may be vertically coupled together. The first upper body 620 and the second lower body 630 may be vertically coupled together. The second lower body 630 and the second upper body 640 may be vertically coupled together.

The first lower holes 612 may vertically face the first upper plate 621. The first lower holes 612 may be spaced downward from the first upper plate 621.

The first outer hole 6221 may be formed radially outward from the first upper plate 621. The first outer hole 6221 may be formed in a position vertically displaced from the first lower holes 612.

The first inner hole 6222 may be formed on a radial inner side of the first upper plate 621. The first inner hole 6222 may be formed in a position vertically displaced from the first lower holes 612.

The first upper body 620 may include a first lower space 6251 formed between the first upper plate 621 and the first lower holes 612. Mist admitted to the first lower space 6251 through the first lower holes 612 may hit the first upper plate 621.

The first upper body 620 may include a first upper space 6252 formed above the first upper plate 621. Upon hitting the first upper plate 621, the mist may be broken up into a plurality of mist particles with a smaller diameter. The smaller-diameter mist particles may be admitted to the first upper space 6252 through the first outer hole 6221 and the first inner hole 6222.

The second lower holes 632 may vertically face the second upper plate 641. The second lower holes 632 may be spaced downward from the second upper plate 641.

The second outer hole 6421 may be formed radially outward from the second upper plate 641. The second outer hole 6421 may be formed in a position vertically displaced from the second lower holes 632.

The second inner hole 6422 may be formed radially inward from the second upper plate 641. The second inner hole 6422 may be formed in a position vertically displaced from the second lower holes 632.

The second upper body 640 may include a second lower space 6451 formed between the second upper plate 641 and the second lower holes 632. Mist admitted to the second lower space 6451 through the second lower holes 632 may hit the second upper plate 641.

The second upper body 640 may include a second upper space 6452 formed above the second upper plate 641. Upon hitting the second upper plate 641, the mist may be broken up into a plurality of mist particles with a smaller diameter. The smaller-diameter mist particles may be admitted to the second upper space 6452 through the second outer hole 6421 and the second inner hole 6422.

Figure 15:
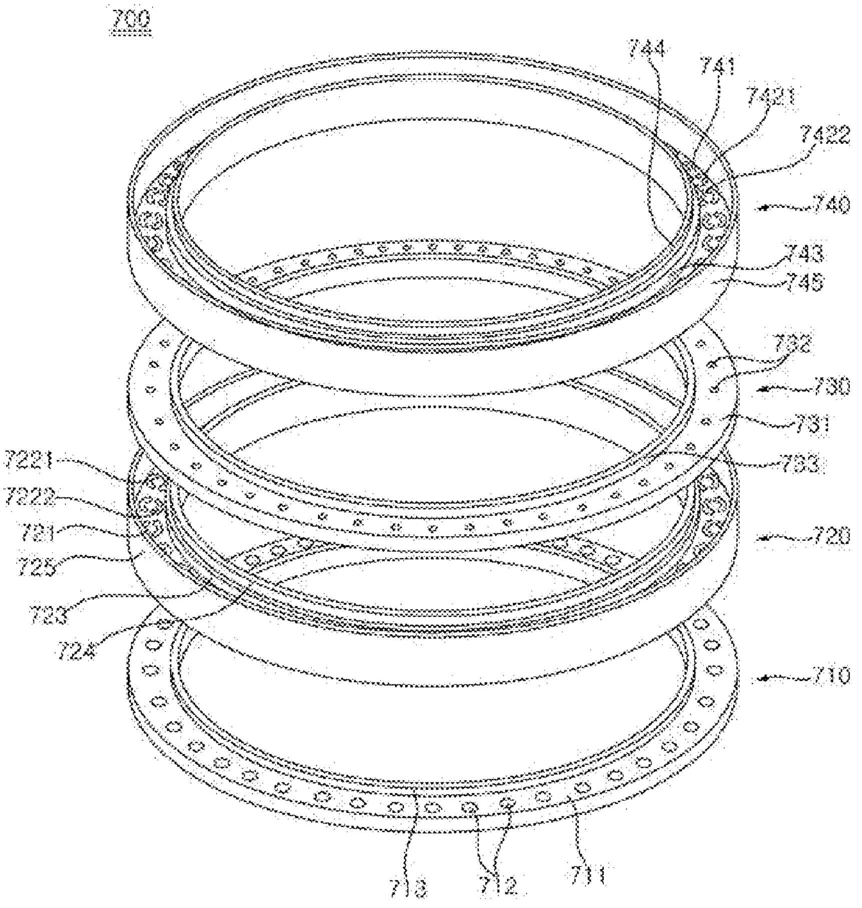
FIG. 15 is an exploded view of an impactor according to another embodiment of the present disclosure.
Figure 16:
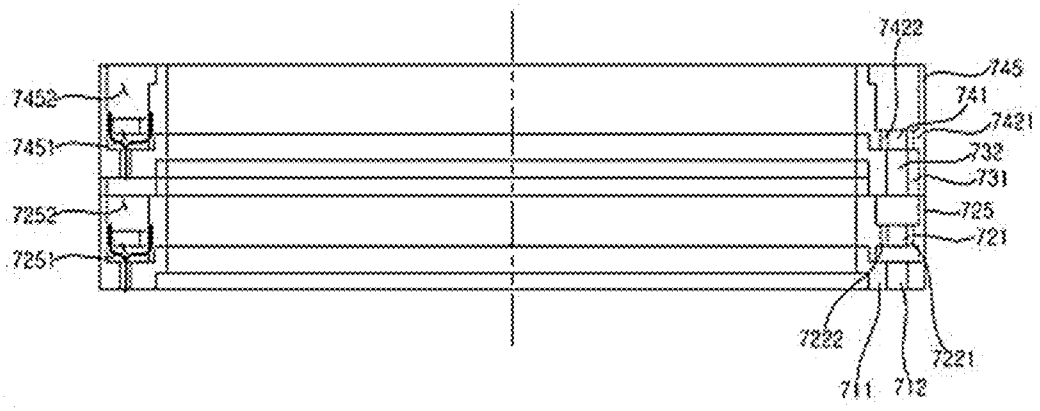
FIG. 16 is a cross-sectional view of an impactor according to another embodiment of the present disclosure.

Referring to FIGS. 15 and 16, an impactor 700 according to another embodiment of the present disclosure will be described. FIG. 15 is an exploded view of the impactor 700 according to another embodiment of the present disclosure. FIG. 16 is a vertical cross-sectional view of the impactor 700 according to another embodiment of the present disclosure.

The impactor 700 may include a first lower body 710. The description of the first lower body 510 given with reference to FIGS. 1 to 12 may apply equally to the first lower body 710, except the first lower holes 712.

The first lower body 710 may include a first lower hole 712. The first lower hole 712 may be cylindrical. The first lower hole 712 may be vertically formed through the first lower plate 711. A plurality of first lower holes 712 may be formed in a circumferential direction of the first lower plate 711, spaced out from one another.

The impactor 700 may include a first upper body 720. The description of the first upper body 520 given with reference to FIGS. 1 to 12 may apply equally to the first upper body 720, except the first upper plate 721, the first outer hole 7221, and the first inner hole 7222.

The first upper body 720 may include a first upper plate 721. The first upper plate 721 may be ring-shaped. The first upper plate 721 may be disposed between a first outer wall 725 and a first upper rim 723.

The first upper body 720 may include a first outer hole 7221. The first outer hole 7221 may be vertically formed through the first upper plate 721. The first outer hole 7221 may be formed more contiguous to the first outer wall 725 than to the first upper rim 723. The first outer hole 7221 may be arc-shaped, bulging toward the first outer wall 725.

The first upper body 720 may include a first inner hole 7222. The first inner hole 7222 may be vertically formed through the first upper plate 721. The first inner hole 7222 may be formed more contiguous to the first upper rim 723 than to the first outer wall 725. The first inner hole 7222 may be arc-shaped, bulging toward the first upper rim 723.

The impactor 700 may include a second lower body 730. The description of the second lower body 530 given with reference to FIGS. 1 to 12 may apply equally to the second lower body 730, except the second lower holes 732.

The second lower body 730 may include a second lower hole 732. The second lower hole 732 may be arc-shaped. The second lower hole 732 may be vertically formed through the second lower plate 731. A plurality of second lower holes 732 may be formed in a circumferential direction of the second lower plate 731, spaced out from one another.

The impactor 700 may include a second upper body 740. The description of the second upper body 540 given with reference to FIGS. 1 to 12 may apply equally to the second upper body 740, except the second upper plate 741, the second outer hole 7421, and the second inner hole 7422.

The second upper body 740 may include a second upper plate 741. The second upper plate 741 may be ring-shaped. The second upper plate 741 may be disposed between a second outer wall 745 and a second upper rim 743.

The second upper body 740 may include a second outer hole 7421. The second outer hole 7421 may be vertically formed through the second upper plate 741. The second outer hole 7421 may be formed more contiguous to the second outer wall 745 than to the second upper rim 743. The second outer hole 7421 may be arc-shaped, bulging toward the second outer wall 745.

The second upper body 740 may include a second inner hole 7422. The second inner hole 7422 may be vertically formed through the second upper plate 741. The second inner hole 7422 may be formed more contiguous to the second upper rim 743 than to the second outer wall 745. The second inner hole 7422 may be arc-shaped, bulging toward the second upper rim 743.

The first lower body 710 and the first upper body 720 may be vertically coupled together. The first upper body 720 and the second lower body 730 may be vertically coupled together. The second lower body 730 and the second upper body 740 may be vertically coupled together.

The first lower holes 712 may vertically face the first upper plate 721. The first lower holes 712 may be spaced downward from the first upper plate 721.

The first outer hole 7221 may be formed in a position vertically displaced from the first lower holes 712.

The first inner hole 7222 may be formed in a position vertically displaced from the first lower holes 712.

The first upper body 720 may include a first lower space 7251 formed between the first upper plate 721 and the first lower holes 712. Mist admitted to the first lower space 7251 through the first lower holes 712 may hit the first upper plate 721.

The first upper body 720 may include a first upper space 7252 formed above the first upper plate 721. Upon hitting the first upper plate 721, the mist may be broken up into a plurality of mist particles with a smaller diameter. The smaller-diameter mist particles may be admitted to the first upper space 7252 through the first outer hole 7221 and the first inner hole 7222.

The second lower holes 732 may vertically face the second upper plate 741. The second lower hole 732 may be spaced downward from the second upper plate 741.

The first outer hole 7421 may be formed in a position vertically displaced from the second lower holes 732.

The second inner hole 7422 may be formed in a position vertically displaced from the second lower holes 732.

The second upper body 740 may include a second lower space 7451 formed between the second upper plate 741 and the second lower holes 732. Mist admitted to the second lower space 7451 through the second lower holes 732 may hit the second upper plate 741.

The second upper body 740 may include a second upper space 7452 formed above the second upper plate 741. Upon hitting the second upper plate 741, the mist may be broken up into a plurality of mist particles with a smaller diameter. The smaller-diameter mist particles may be admitted to the second upper space 7452 through the second outer hole 7421 and the second inner hole 7422.

It will be apparent that, although the exemplary embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure The present disclosure may be embodied in various modifications, and its scope of rights is not limited by the foregoing embodiments. Thus, the modifications should be construed as falling within the scope of this disclosure as long as they include components as claimed in the claims of this disclosure.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidifier, comprising:

a case with an intake opening;

a fan disposed inside of the case;

a discharge opening positioned downstream of the fan;

a humidification assembly including a humidification device disposed between the fan and the discharge opening that sprays supplied water, and an outlet through which mist produced by the humidification device is discharged; and an impactor disposed between the outlet and the discharge opening, to which the mist discharged through the outlet is admitted, wherein the impactor includes:

at least one lower body including a lower plate disposed above the outlet and a lower hole formed through the lower plate; and at least one upper body including an upper plate disposed above the lower body and an upper hole vertically formed through the upper plate.

2. The humidifier of claim 1, wherein the mist discharged from the humidification assembly is discharged through the discharge opening after hitting the impactor.

3. The humidifier of claim 1, wherein the lower hole and the upper hole are alternately arranged in a circumferential direction of the impactor.

4. The humidifier of claim 1, wherein a diameter of the lower hole is larger than a diameter of the upper hole.

5. The humidifier of claim 1, wherein the lower hole vertically faces the upper plate, and the upper hole vertically faces the lower plate.

6. The humidifier of claim 1, wherein the lower hole is vertically spaced apart from the upper plate, and the impactor includes a lower space formed between the lower hole and the upper plate.

7. The humidifier of claim 1, wherein the impactor further includes:

an outer wall that surrounds the upper plate; and an upper space surrounded by the outer wall and formed above the upper hole.

8. The humidifier of claim 1, wherein the at least one lower body comprises a first lower body including a first lower plate disposed above the outlet and a first lower hole formed through the first lower plate; wherein the at least one upper body comprises a first upper body attached to a top of the first lower body and including a first upper hole which is vertically formed; wherein the at least one lower body further comprises a second lower body attached to a top of the first upper body and including a second lower hole which is vertically formed; and wherein the at least one upper body further comprises a second upper body attached to a top of the second lower body and including a second upper hole which is vertically formed.

9. The humidifier of claim 8, wherein mist that has passed through the first upper hole is admitted into the second lower body through the second lower hole.

10. The humidifier of claim 8, wherein a diameter of the first lower hole is larger than a diameter of the second lower hole.

11. The humidifier of claim 1, further comprising:

a water reservoir disposed inside of the case, that stores water supplied to the humidification assembly; and a humidification flow path formed between the outlet and the discharge opening and surrounding the water reservoir, wherein the impactor is disposed in the humidification flow path in such a way as to surround the water reservoir.

12. The humidifier of claim 11, wherein the water reservoir includes:

a bucket that forms a space for storing water; and a bucket housing that holds the bucket, wherein the impactor is positioned below the bucket.

13. The humidifier of claim 11, wherein the water reservoir includes a guide rim that protrudes toward the humidification flow path and is positioned above the outlet, wherein the impactor is seated on a top of the guide rim.

14. A humidifier, comprising:

a case with an intake opening:

a fan disposed inside of the case;

a discharge opening positioned downstream of the fan;

a humidification assembly including a humidification device disposed between the fan and the discharge opening, that sprays supplied water, and an outlet through which mist produced by the humidification device is discharged; and an impactor disposed between the outlet and the discharge opening, to which the mist discharged through the outlet is admitted, and wherein the impactor includes:

a lower body disposed above the outlet and including a lower hole which is vertically formed;

an upper plate disposed above the lower body;

an outer wall spaced radially outward from the upper plate;

an upper rim spaced radially inward from the upper plate;

an outer bridge that connects the upper plate and the outer wall;

an inner bridge that connects the upper plate and the upper rim;

an outer hole formed between the upper plate and the outer wall; and an inner hole formed between the upper plate and the upper rim.

15. The humidifier of claim 14, wherein the outer hole and the inner hole are spaced apart from each other radially of the impactor, and the lower hole, positioned between the outer hole and the inner hole, faces the upper plate.

16. A humidifier, comprising:

a case with an intake opening:

a fan disposed inside of the case;

a discharge opening positioned downstream of the fan;

a humidification assembly including a humidification device disposed between the fan and the discharge opening, that sprays supplied water, and an outlet through which mist produced by the humidification device is discharged; and an impactor disposed between the outlet and the discharge opening, to which the mist discharged through the outlet is admitted, wherein the impactor includes:

a lower body including a lower plate disposed above the outlet and a lower hole vertically formed through the lower plate;

an upper plate disposed above the lower body;

an inner hole vertically formed through the upper plate and positioned further radially inward of the impactor than the lower hole; and an outer hole vertically formed through the upper plate and positioned further radially outward of the impactor than the lower hole.

17. The humidifier of claim 16, wherein the inner hole is formed to bulge radially inward of the impactor, and the outer hole is formed to bulge radially outward of the impactor.

* * * * *